(12) United States Patent
Sonehara

(10) Patent No.: US 7,635,187 B2
(45) Date of Patent: Dec. 22, 2009

(54) IMAGE DISPLAY DEVICE

(75) Inventor: Tomio Sonehara, Takaide (JP)

(73) Assignee: Seiko Epson Corporation, Tokyo (JP)

( * ) Notice: Subject to any disclaimer, the term of this patent is extended or adjusted under 35 U.S.C. 154(b) by 481 days.

(21) Appl. No.: 11/388,994

(22) Filed: Mar. 27, 2006

(65) Prior Publication Data
US 2006/0215118 A1 Sep. 28, 2006

(30) Foreign Application Priority Data
Mar. 25, 2005 (JP) .............................. 2005-088714

(51) Int. Cl.
G03B 21/14 (2006.01)
(52) U.S. Cl. .............................. 353/8; 349/15; 359/464; 353/20; 353/34
(58) Field of Classification Search .................. 353/7, 353/8, 20, 31, 33, 34, 37, 84; 349/5, 15, 349/9; 359/464, 465
See application file for complete search history.

(56) References Cited

U.S. PATENT DOCUMENTS

| 5,042,921 A * | 8/1991 | Sato et al. ................. 349/9 |
| 5,172,254 A * | 12/1992 | Atarashi et al. ............. 349/9 |
| 5,512,967 A * | 4/1996 | Bohannon ................... 353/31 |
| 5,575,548 A * | 11/1996 | Lee .......................... 353/31 |
| 6,972,810 B2 * | 12/2005 | Magarill et al. ............. 349/8 |
| 7,240,416 B2 * | 7/2007 | Milojevic et al. .......... 29/592.1 |
| 2006/0290889 A1 * | 12/2006 | Robinson et al. ............ 353/8 |

FOREIGN PATENT DOCUMENTS

| CN | 1570704 A | 1/2005 |
| CN | 1579100 A | 2/2005 |
| JP | A 07-152026 | 6/1995 |
| JP | A 07-175060 | 7/1995 |
| JP | A-10-069012 | 3/1998 |
| JP | A 2003-185969 | 7/2003 |
| WO | WO 02/104040 A1 | 12/2002 |

* cited by examiner

Primary Examiner—William C Dowling
(74) Attorney, Agent, or Firm—Oliff & Berridge PLC

(57) ABSTRACT

An image display device includes an illumination system including a light source that emits light; a polarization separating system which polarizes and separates the light emitted from the illumination system; plural color separation systems which are provided in relation to the illumination system, and each of which separates each of lights generated by the polarization separating system into plural basic color lights; plural spatial light modulators which are provided correspondingly to the color separation systems, and each of which light-modulates the plural basic color lights generated by the color separation system respectively according to image signals; plural color synthesizing systems which are provided correspondingly to the color separation systems, and each of which synthesizes the basic color lights modulated by the spatial light modulator; a polarization synthesizing system which synthesizes the lights generated respectively by the plural color synthesizing systems; and a projection system which projects the light generated by the polarization synthesizing system on a projection surface.

6 Claims, 4 Drawing Sheets

IMAGE DISPLAY DEVICE

BACKGROUND

1. Technical Field

The present invention relates to an image display device.

2. Related Art

As an example of an image display device (projector) which projects color light including image information generated in a spatial light modulator such as a liquid crystal device through a projection system on a screen, there has been known a rear projection type image display device (rear projector) which projects the color light from the rear of the screen. Further, a stereoscopic image display device has been known, which projects color light that are different in polarization direction from each other on the screen, and causes a viewer to recognize a projected image as a stereoscopic image (refer to JP-A-2003-185969).

In the related arts, a projector for forming an image for one eye and a projector for forming an image for the other eye are individually provided. Namely, the two projectors have their light source independently. In this case, if the quantity of light emitted from the light source of each projector varies, disadvantage that a difference is produced between the image for one eye and the image for the other eye or color registration error is produced is produced, so that there is possibility that a desired image cannot be displayed.

SUMMARY

An advantage of an aspect of the invention is to provide an image display device which can display a desired image.

An image display device according to an aspect of the invention comprises an illumination system including a light source that emits light; a polarization separating system which polarizes and separates the light emitted from the illumination system; plural color separation systems which are provided in relation to the illumination system, and each of which separates each of lights generated by the polarization separating system into plural basic color lights; plural spatial light modulators which are provided correspondingly to the color separation systems, and each of which light-modulates the plural basic color lights generated by the color separation system respectively according to image signals; plural color synthesizing systems which are provided correspondingly to the color separation systems, and each of which synthesizes the basic color lights modulated by the spatial light modulator; a polarization synthesizing system which synthesizes the lights generated respectively by the plural color synthesizing systems; and a projection system which projects the light generated by the polarization synthesizing system on a projection surface.

According to this aspect of the invention, light is emitted from one illumination system including the light source, and the light emitted from the illumination system is polarized and separated by the polarization separating system. The plural lights generated by the polarization separating are caused to respectively pass through the plural color separation systems, spatial light modulators, and color synthesizing systems which are provided correspondingly to the plural light, whereby plural images based on the lights which have the different polarization directions from each other are generated. The plural lights that are different in polarization directions from each other are synthesized by the color synthesizing system and the synthesized light is supplied to one projection system. Therefore, the disadvantage caused by the existence of the plural illumination systems each including the light source is prevented, and the plural lights that are different in polarization directions from each other can be projected respectively on the projection surface.

It is preferable that the optical distance between a light exit surface of each of the plural spatial light modulators and the projection system is equal. Hereby, their states of the plural lights projected onto the projection surface, which are different in polarization direction from each other, can be made nearly equivalent.

Further, it is preferable that the image display device further comprises a first polarization converting element which is provided for a light incident part of a first color separation system of the plural color separation systems, and converts the light polarization direction; and a second polarization converting element which is provided for a light exit part of a second color synthesizing system corresponding to a second color separation system different from the first color separation part, of the plural color synthesizing systems, and converts the light polarization direction. Hereby, the plural lights which are different in polarization direction from each other can be respectively projected on the projection surface.

Further, it is preferable that: the basic color light includes red light, green light, and blue light; a first color synthesizing system of the plural color synthesizing system supplies red light and blue light in the first polarization, and green light in the second polarization to the polarization synthesizing system; and the second color synthesizing system supplies red light and blue light in the second polarization, and green light in the first polarization to the polarization synthesizing system. Hereby, a desired full color image can be formed.

Further, it is preferable that the image display device includes a pair of glasses having a transmission part for one eye which transmits only the first polarization light of the lights projected through the projection surface from the projection system, and a transmission part for the other eye which transmits only the second polarization light. Hereby, a viewer putting on the glasses can recognize a stereoscopic image.

Further, it is preferable that the spatial light modulator includes a liquid crystal device. Hereby, a desired image according to an image signal can be projected.

BRIEF DESCRIPTION OF THE DRAWINGS

The invention will be described with reference to the accompanying drawings, wherein like numerals reference like elements.

DESCRIPTION OF EXEMPLARY EMBODIMENT

One embodiment of the invention will be described below with reference to drawings. In the following description, XYZ orthogonal coordinates are set, and referring to this XYZ orthogonal coordinates, positional relation of each member will be described. A predetermined direction in a horizontal plane is taken as an X-axis direction, a direction orthogonal to the X-axis direction in the horizontal plane is taken as a Y-axis direction, and a direction respectively orthogonal to the X-axis direction and the Y-axis direction (namely, a vertical direction) is taken as a Z-axis direction. Further, rotational directions around the X-axis, the Y-axis, and the Z-axis are respectively taken as a θX-direction, a θY-direction, and a θZ-direction.

Figure 1:
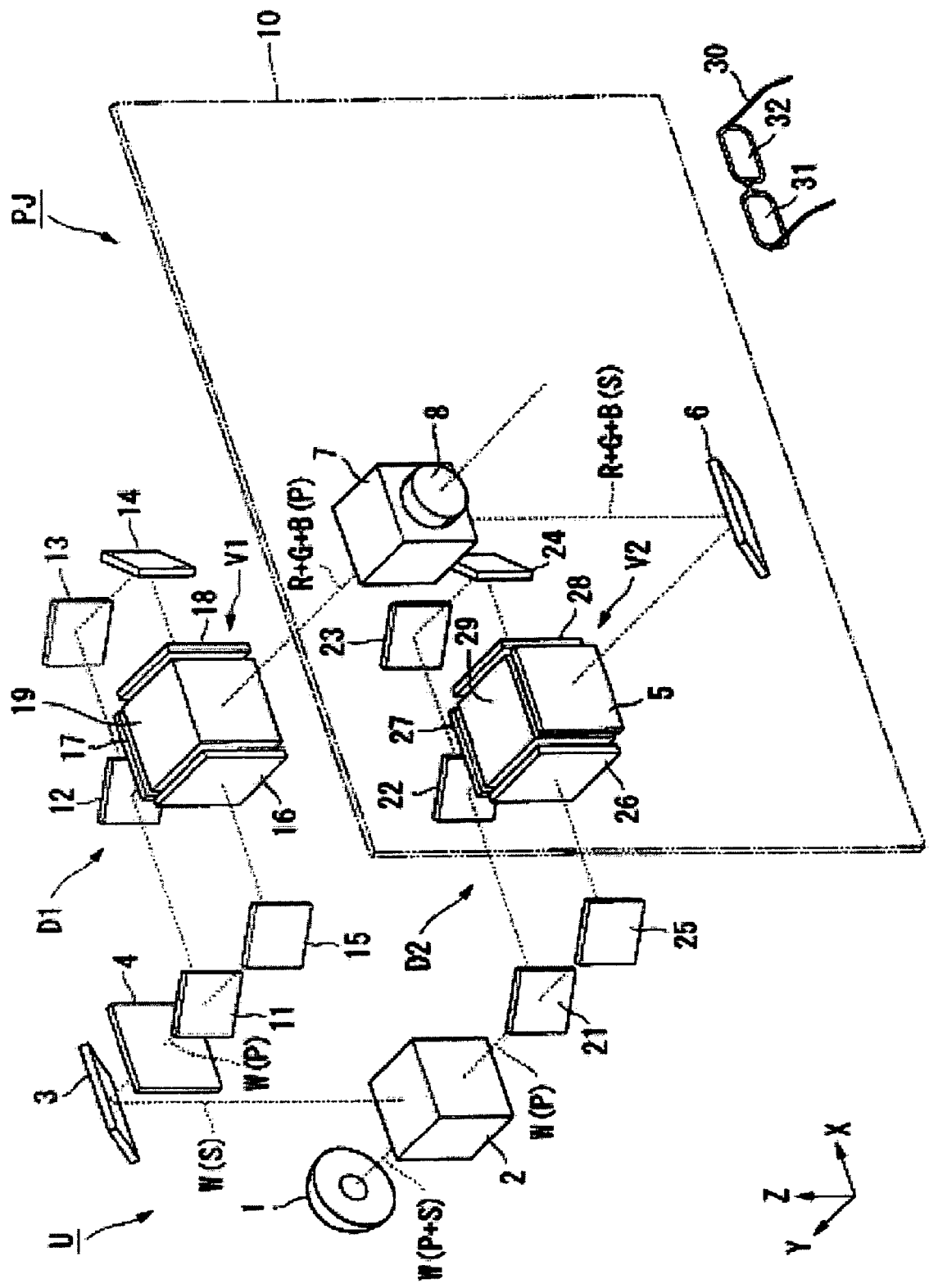
FIG. 1 is a perspective view showing the schematic constitution of an image display device according to an embodiment.
Figure 2:
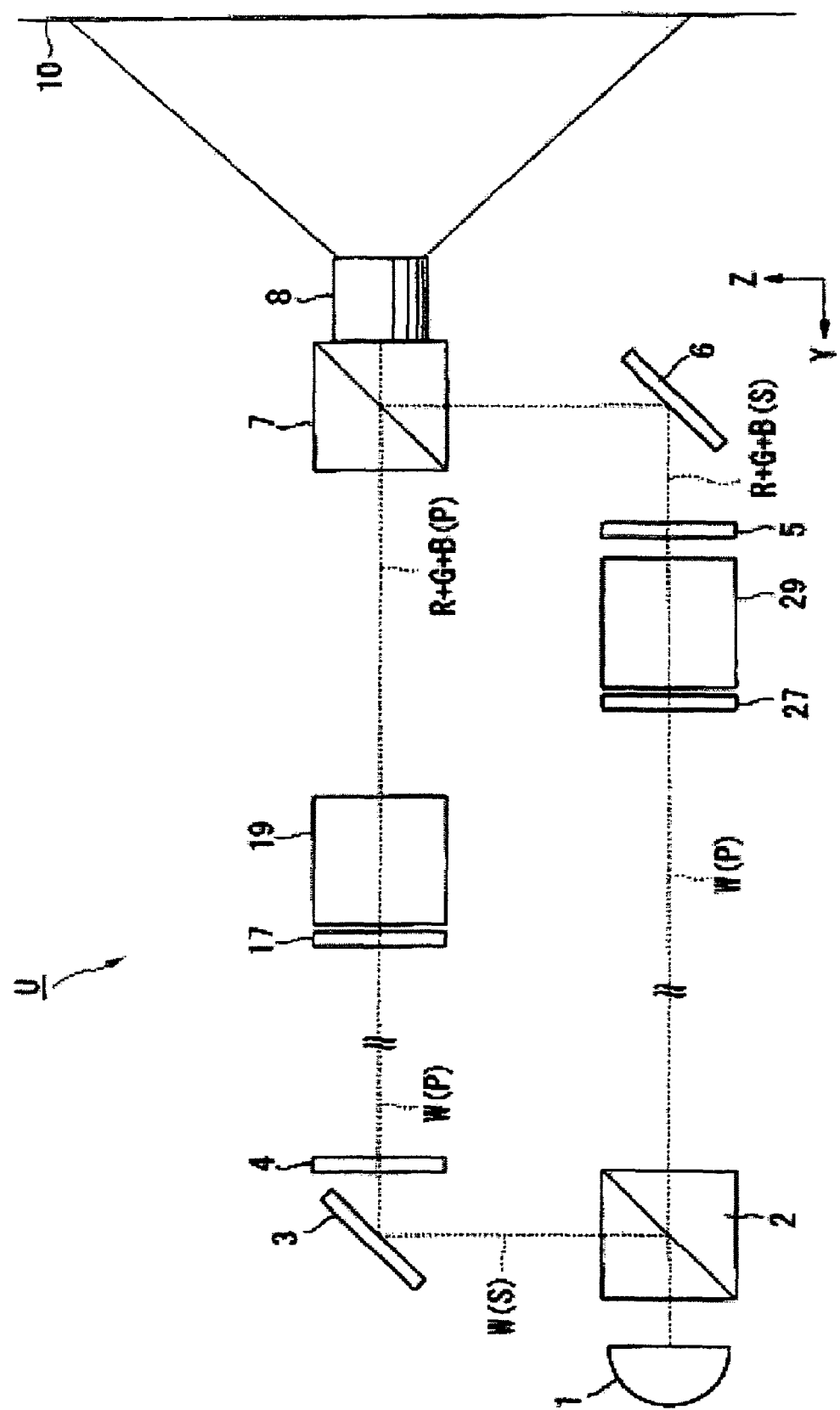
FIG. 2 is a side view in which a part of FIG. 1 is taken out.
Figure 3:
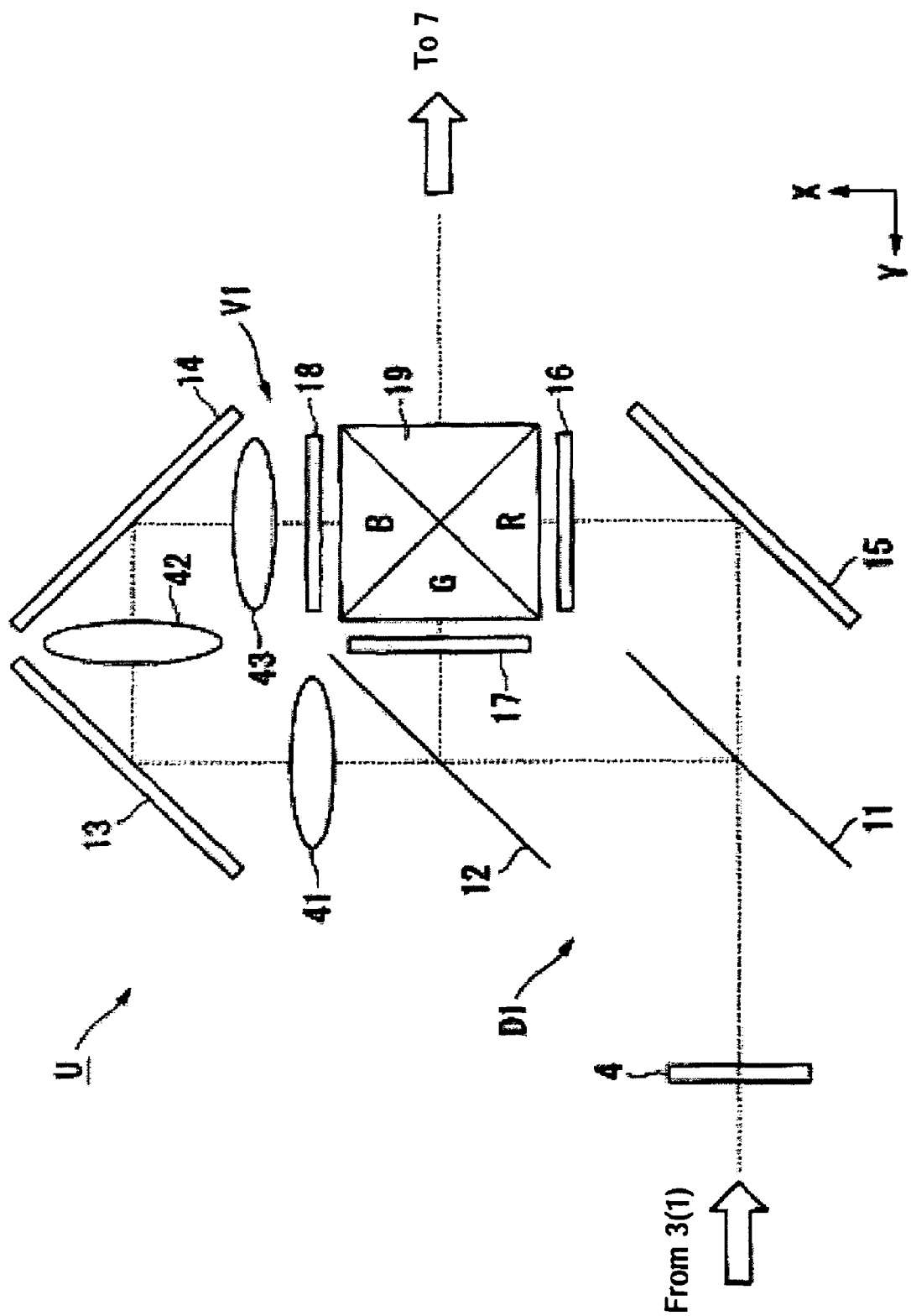
FIG. 3 is a plan view showing a first color separation system, a first spatial light modulator, and a first color synthesizing system.
Figure 4:
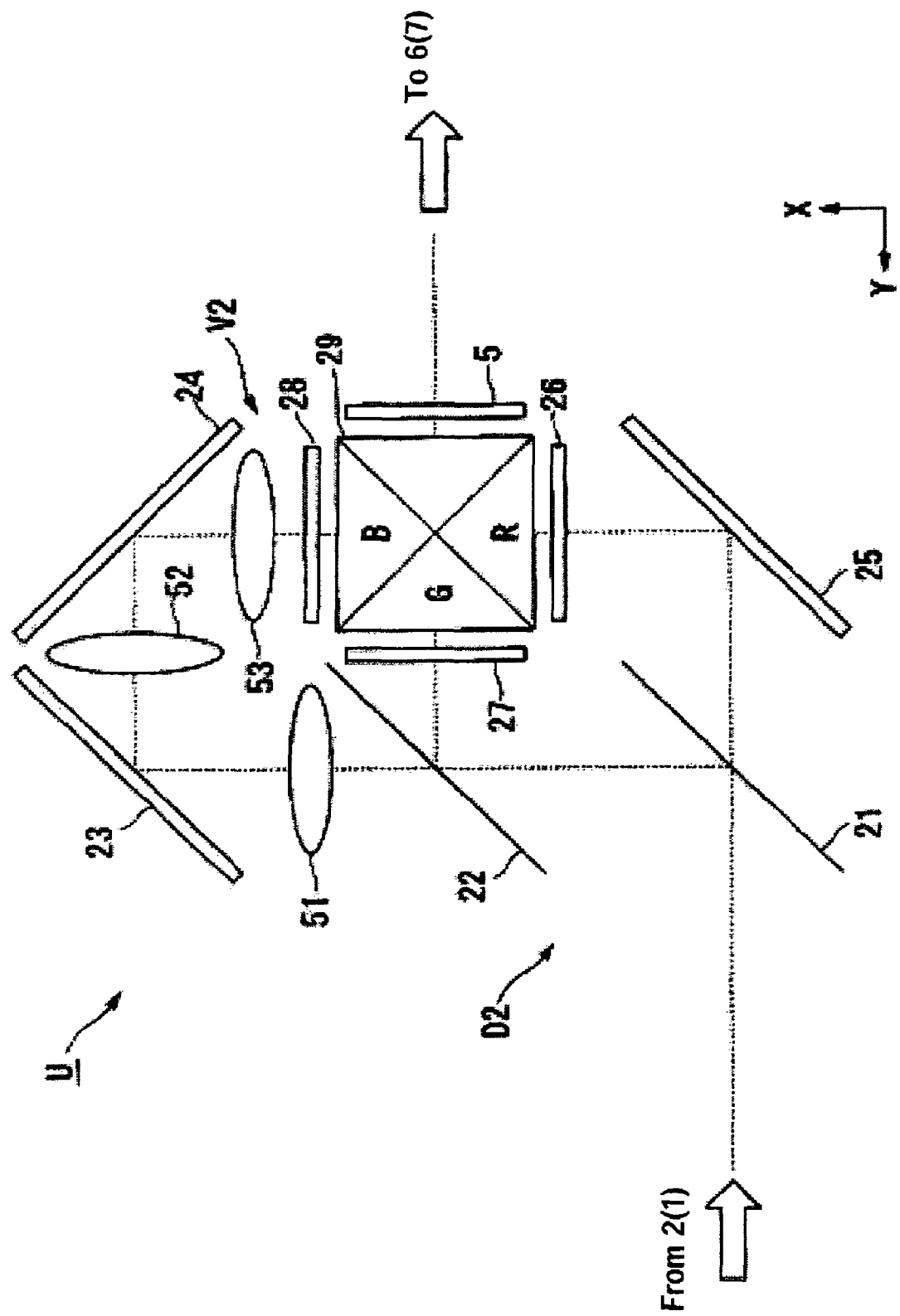
FIG. 4 is a plan view showing a second color separation system, a second spatial light modulator, and a second color synthesizing system.

FIG. 1 is a perspective view showing the schematic constitution of an image display device according to this embodiment. FIG. 2 is a side view in which a part of FIG. 1 is taken out. FIG. 3 is a plan view showing a first color separation system D1, a first spatial light modulator V1, and a first color synthesizing system 19, which will be described later. FIG. 4 is a plan view showing a second color separation system D2, a second spatial light modulator V2, and a second color synthesizing system 29.

In FIG. 1, an image display device PJ includes a screen (projection surface) 10, and a projection unit U which projects an image on the screen 10. Light is projected from the projection unit U on the screen 10, whereby an image is formed on the screen 10. The image display device PJ in the embodiment is a rear projection type image display device which projects the image from the rear side of the screen 10 on the screen 10, that is, a so-called rear projector. In the following description, the image display device is appropriately referred to as a "projector".

The projection unit U includes an illumination system 1 including a light source that emits light; a polarization separating system 2 which separates the light emitted from the illumination system 1 according to a polarization direction; plural color separation systems D1, D2 which are provided in relation to the illumination system, and each of which separates each of lights generated by the polarization separating system 2 into plural basic color lights; plural spatial light modulators V1, V2 which are provided correspondingly to the color separation systems D1, D2, and each of which light-modulates the plural basic color lights generated by the color separation system D1, D2 respectively according to image signals; plural color synthesizing systems 19, 29 which are provided correspondingly to the color separation systems D1, D2, and each of which synthesizes the basic color lights modulated by the spatial light modulator V1, V2; a polarization synthesizing system 7 which synthesizes the lights generated respectively by the plural color synthesizing systems 19, 29; and a projection system (projection optical system) 8 which projects the light generated by the polarization synthesizing system 7 on the screen 10.

In the embodiment, the projection unit U has the two color separation systems; a first color separation system D1 and a second color separation system D2. Further, the projection unit U has the two spatial light modulators; a first spatial light modulator V1 and a second spatial light modulator V2. Further, the projection unit U has the two color synthesizing systems; a first color synthesizing system 19 and a second color synthesizing system 29.

The illumination system 1 is composed of a light source, an integrator system, and a lens system. The light source can be formed of, for example, a superhigh pressure mercury-vapor lamp, a metal-halide lamp, or a xenon lamp, and emits white light (W). The number of light sources is one. The integrator system includes, for example, a fly-eyes lens, and uniformizes illuminance of light (white light) that is emitted from the light source to the polarization separating system 2.

FIGS. 1 and 2, the polarization separating system 2 is composed of, for example, a polarization beam splitter; and separates the light emitted from the illumination system 1 into p-polarized light and s-polarization light. The s-polarized light separated by the polarization separating system 2 is supplied to the first color separating system D1 side, and the p-polarized light is supplied to the second color separating system D2 side.

The s-polarized light, of the p-polarized light and the s-polarized light separated by the polarization separating system 2, reflects on a reflection mirror 3, and thereafter is incident on a first polarization converting element 4. The first polarization converting element 4 converts the polarization direction of light. By the first polarization converting element 4, the s-polarized light is converted into the p-polarized light.

In FIGS. 1, 2, and 3, the white light (W) of p-polarized light that has been obtained by passing through the first polarization converting element 4 is separated into plural basic color lights by the first color separation system D1. The first polarization converting element 4 is provided for a light incident part of the first color separation system D1. The first color separation system D1 includes a first dichroic mirror 11 and a second dichroic mirror 12. Further, the first spatial light modulator V1 provided corresponding to the first color separation system D1 includes a red light valve 16, a green light valve 17, and a blue light valve 18.

The first dichroic mirror 11 transmits light in a red wavelength band (hereinafter referred to as red light (R)), and reflects lights in other wavelength bands. The red light (R) that has passed through the first dichroic mirror 11 reflects on the reflection mirror 15, and is led to the red light valve 16. On the other hand, the lights that have reflected on the first dichroic mirror 11 are led to the second dichroic mirror 12.

The second dichroic mirror 12 transmits light in a blue wavelength band (hereinafter referred to as blue light (B)), and reflects light in a green wavelength band (hereinafter referred to as green light (G)). The green light (G) that has reflected on the second dichroic mirror 12 is led to the green light valve 17. Further, the blue light (B) that has passed through the second dichroic mirror 12 is led to the blue light valve 18 through a relay lens 41, a reflection mirror 13, a relay lens 42, a reflection mirror 14, and a relay lens 43.

Each light valve 16, 17, 18 of the first spatial light modulator V1 is composed of a liquid crystal device. The light valve includes an incident side polarization plate, a panel part having liquid crystal sealed between a pair of glass substrates, and an exit side polarization plate. For the glass substrate, a pixel electrode and an alignment layer are provided. The light valve transmits only the light in the predetermined vibration direction. Each basic color light (red light, green light, or blue light) that has been incident on the light valve is light-modulated by passing through the light valve.

The basic color lights (modulation lights) modulated by passing through their light valves 16, 17, and 18 are synthesized by the first color synthesizing system 19. The first color synthesizing system 19 is composed of a dichroic prism, and the red light (R), the green light (G), and the blue light (B) that are p-polarized lights are synthesized by the first color synthesizing system 19 thereby to become color synthetic light. The light emitted from the first color synthesizing system 19 is color synthetic light of p-polarized light. The color synthetic light of p-polarized light emitted from the first color synthesizing system 19 is led to the polarization synthesizing system 7. Therefore, to the polarization synthesizing system 7, the red light (R), the green light (G), and the blue light (B) that are p-polarized lights are supplied.

The p-polarized light, of the p-polarized light and the s-polarized light separated by the polarization separating system 2, is incident on the second color separation system D2.

In FIGS. 1, 2, and 4, the white light (W) of p-polarized light that has been polarized and separated by the polarization separating part 2 is separated into plural basic color lights by the second color separation system D2. The second color separation system D2 includes a first dichroic mirror 21 and a second dichroic mirror 22. Further, the second spatial light modulator V2 provided corresponding to the second color separation system D2 includes a red light valve 26, a green light valve 27, and a blue light valve 28.

The first dichroic mirror 21 transmits the red light (R), and reflects lights in other wavelength bands. The red light (R) that has passed through the first dichroic mirror 21 reflects on a reflection mirror 25, and is led to the red light valve 26. On the other hand, the lights that have reflected on the first dichroic mirror 21 are led to the second dichroic mirror 22.

The second dichroic mirror 22 transmits the blue light (B), and reflects the green light (G). The green light (G) that has reflected on the second dichroic mirror 22 is led to the green light valve 27. Further, the blue light (B) that has passed through the second dichroic mirror 22 is led to the blue light valve 28 through a relay lens 51, a reflection mirror 23, a relay lens 52, a reflection mirror 24, and a relay lens 53.

Each light valve 26, 27, 28 of the second spatial light modulator V2 is composed of a liquid crystal device. Each basic color light (red light, green light, or blue light) that has been incident on the light valve is light-modulated by passing through the light valve.

The basic color lights (modulation lights) modulated by passing through their light valves 26, 27, and 28 are synthesized by the second color synthesizing system 29. The second color synthesizing system 29 is composed of a dichroic prism, and the red light (R), the green light (G), and the blue light (B) that are p-polarized lights are synthesized by the second color synthesizing system 29 thereby to become color synthetic light. The light emitted from the second color synthesizing system 29 is the color synthetic light of p-polarized light.

For a light exit part of the second color synthesizing system 29, a second polarization converting element 5 which converts the polarization direction of light is provided. By the second polarization converting element 5, the color synthetic light of p-polarized light emitted from the second color synthesizing system 29 is converted into color synthetic light of s-polarized light. The color synthetic light of s-polarized light that has emitted from the second color synthesizing system 29 and passed through the second polarization converting element 5 is led to the polarization synthesizing system 7 through a reflection mirror 6. Therefore, to the polarization synthesizing system 7, the red light (R), the green light (G), and the blue light (B) that are the s-polarized lights are supplied.

The lights synthesized by the polarization synthesizing system 7, that is, the color synthetic light of p-polarized light and the color synthetic light of s-polarized light are projected on the screen 10 by the projection system 8. The projection system 8 is a so-called magnification system which magnifies an image on the incident side to project the image on the screen 10. Hereby, the projection unit U can form a synthetic image of full color on the screen 10. From the front side of the screen, the viewer sees the image (synthetic image) projected on the screen 10 from the backside of the screen 10 by the projection unit U.

In the embodiment, the optical distance between the light exit surface of each of the plural light valves 16, 17, 18, 26, 27, and 28 and the projection system 8 is equal. Hereby, their states of the plural lights projected onto the screen 10, which are different in polarization direction from each other, can be made nearly equivalent, so that a desired image can be formed on the screen 10.

Further, the projector PJ in the embodiment can be used as a stereoscopic image display device. Namely, in order to cause a viewer to recognize the image projected on the screen 10 as a stereoscopic image, the projector PJ projects full-color synthetic light of s-polarized light as an image for one eye (for example, image for left eye) on the screen 10, and projects full-color synthetic light of p-polarized light as an image for the other eye (for example, image for right eye) on the screen 10.

The viewer, by putting on a pair of glasses 30 as shown in FIG. 1, which has an s-polarized light transmission film 31 on the left eye side, and a p-polarized light transmission film 32 on the right eye side, can recognize a stereoscopic image. Here, the s-polarized light transmission film 31 on the left eye side of the glasses 30 functions as a transmission part for left eye which transmits only the s-polarized light through the screen 10, and the p-polarized light transmission film 32 on the right eye side of the glasses 30 functions as a transmission part for right eye which transmits only the p-polarized light through the screen 10.

As described above, the light emitted from one illumination system (light source) is separated by the polarization separating system 2 into the s-polarized light and the p-polarized light. These separation lights are caused to respectively pass through the two color separation systems D1, D2, spatial light modulators V1, V2, and color synthesizing systems 19, 29. Thereafter, lastly, their two lights (s-polarized light full color synthetic light, p-polarized light full color synthetic light) are synthesized by the polarization synthesizing system 7, and the synthesized light is projected from one projection system 8 on the screen 10. Therefore, the disadvantage caused by the existence of the plural light sources (illumination systems) is prevented, and the two lights can be projected on the screen 10. Namely, in case of the two (plural) light sources, such the disadvantage is produced that: there is a difference between the quantity of lights emitted respectively from the two light sources; or in case that either of the two light sources is large in deterioration with time, a difference is produced between the image for one eye and the image for the other eye or color registration error is produced. In result, there is possibility that the desired image cannot be displayed. However, in the embodiment, since the number of the light sources is one, such the disadvantage can be prevented. Further, since the number of the light source and the number of the projection system are respectively one, it is possible to suppress occurrence of illumination ununiformity, color irregularity, or flicker on the screen 10.

Further, since the number of the projection system 8 is also one, positioning of the projection system 8 to the screen 10 is performed for only one projection system 8. Therefore, compared with the construction in which the plural projection systems exit, setting of the projection system 8 (projection unit U) can be readily performed.

Further, in the embodiment, the first color separation system D1 and the second color separation system D2 are nearly similar to each other in construction, the first spatial light modulator V1 and the second spatial light modulator V2 are nearly similar to each other in construction, and the first color synthesizing system 19 and the second color synthesizing system 29 are nearly similar to each other in construction. Therefore, it is not necessary to prepare the color separation systems that are different from each other in construction, the spatial light modulators that are different from each other in construction, and the color synthesizing systems that are different from each other in construction. By the following simple construction, the projection unit U in the embodiment can be manufactured: the same kinds of plural color separation systems, the same kinds of plural separation light modulators, the same kinds of plural color synthesizing systems are prepared; these members are combined one by one into a unit; two units are combined; the first polarization element 4 is arranged on the light incident part side of the first color separation system; and the second polarization element 5 is arranged on the light exit part side of the second color separation system.

As described above, the first color separation system D1 and the second color separation system D2 are nearly similar to each other in construction, the first spatial light modulator V1 and the second spatial light modulator V2 are nearly similar to each other in construction, and the first color synthesizing system 19 and the second color synthesizing system 29 are nearly similar to each other in construction. Further, from the first color synthesizing system 19, the red light (R), the green light (G), and the blue light (B) that are the p-polarized lights are supplied to the polarization synthesizing system 7. From the second color synthesizing system 29, the red light (R), the green light (G), and the blue light (B) that are the s-polarized lights are supplied through the second polarization converting element 29 to the polarization synthesizing system 7. However, the first color synthesizing system 19 may supply the red light (R) and the blue light (B) that are the s-polarized lights, and the green light (G) that is the p-polarized light to the polarization synthesizing system 7; and the second color synthesizing system 29 may supply the red light (R) and the blue light (B) that are the p-polarized lights, and the green light (G) that is the s-polarized light to the polarization synthesizing system 7. For example, by arranging a polarization converting element on an optical path of the green light (G) generated by the dichroic mirror thereby to make the polarization direction of the green light (G) different from the polarization direction of the red light (R) and the polarization direction of the blue light (B), the above construction can be realized. Alternatively, using a picture signal supply unit disclosed in JP-A-2003-185969, the polarization direction of the green light (G) that is incident on the color synthesizing system may be made different from that of the red light (R) and that of the blue light (B).

In the embodiment, the image display device of the invention is applied to the rear projection type image display device (rear projector) which projects the image on the screen 10 from the rear side of the screen 10. However, the invention may be applied to an image display device which projects the image on the screen from the front side of the screen.

In the embodiment, regarding one basic color light, the lights having the polarization directions orthogonal to each other are projected on the screen 10, whereby the stereoscopic image is formed. The polarization directions are not limited to the s-polarized light and the p-polarized light that are linear polarized lights, but may be right-circularly polarized light and left-circularly polarized light that are circularly polarized lights.

In the embodiment, the image display device of the invention is applied to the stereoscopic image display device, but may be applied to a device which displays a two-dimensional image. In this case, on the screen 10, the lights having the polarization directions orthogonal to each other need not be projected. Namely, from each projection unit, the light having the same polarization direction may be projected.

In the embodiment, though the liquid crystal device (light valve) is used as the spatial light modulator, for example, a reflection type light modulator (mirror modulator) such as a DMD (Digital Micromirror Device) may be used.

The entire disclosure of Japanese Patent Application No. 2005-088714, filed Mar. 25, 2005 is expressly incorporated by reference herein.

What is claimed is:

1. An image display device comprising:
an illumination system including a light source that emits light;
a polarization separating system which separates the light emitted from the illumination system according to a polarization direction;
plural color separation systems which are provided in relation to the illumination system, and each of which separates each of lights generated by the polarization separating system into plural basic color lights;
plural spatial light modulators which are provided corresponding to the color separation systems, and each of which light-modulates the plural basic color lights generated by the color separation system respectively according to image signals, the plural spatial light modulators having a similar construction to act on light of a same polarization;
plural color synthesizing systems which are provided corresponding to the color separation systems, and each of which synthesizes the basic color lights modulated by the spatial light modulator;
a polarization synthesizing system which synthesizes the lights generated respectively by the plural color synthesizing systems;
a projection system which projects the light generated by the polarization synthesizing system on a projection surface;
a first polarization converting element which is provided for a light incident part of a first color separation system of the plural color separation systems, and converts the light polarization direction of the light incident on the first color separation system such that the plural basic color lights supplied to each of the plural spatial light modulators is of the same polarization; and
a second polarization converting element which is provided for a light exit part of a second color synthesizing system of the plural color synthesizing systems, corresponding to a second color separation system different from the light incident part of the first color separation system, and converts the light polarization direction.

2. The image display device of claim 1, wherein the optical distance between a light exit surface of each of the plural spatial light modulators and the projection system is substantially equal.

3. The image display device of claim 1, including a pair of glasses having a transmission part for one eye which transmits only the first polarization light of the lights projected through the projection surface from the projection system, and a transmission part for the other eye which transmits only the second polarization light of the lights projected through the projection surface from the projection system.

4. The image display device of claim 1, wherein the spatial light modulator includes a liquid crystal device.

5. The image display device of claim 1, wherein the projection system projects a full-color synthetic light of s-polarized light as a left-eye image and a full-color synthetic light of p-polarized light as a right-eye image to create a stereoscopic image.

6. The image display device of claim 1, further comprising:
a first color synthesizing system of the plural color synthesizing systems that is configured to supply red light and blue light in a first polarization direction and green light in a second polarization direction to the polarization synthesizing system; and a second color synthesizing system of the plural color synthesizing systems that is configured to supply red light and blue light in the second polarization direction and green light in the first polarization direction to the polarization synthesizing system.

* * * * *

UNITED STATES PATENT AND TRADEMARK OFFICE
CERTIFICATE OF CORRECTION

PATENT NO.         : 7,635,187 B2
APPLICATION NO. : 11/388994
DATED              : December 22, 2009
INVENTOR(S)        : Tomio Sonehara It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 575 days.

Signed and Sealed this

Ninth Day of November, 2010

David J. Kappos
*Director of the United States Patent and Trademark Office*